(12) United States Patent
Phu (10) Patent No.: US 7,623,504 B2
(45) Date of Patent: Nov. 24, 2009

(54) WIRELESS DATA COMMUNICATIONS

(75) Inventor: Thinh Nguyen Phu, Southlake, TX (US)

(73) Assignee: Nokia Corporation, Espoo (FI)

( * ) Notice: Subject to any disclaimer, the term of this patent is extended or adjusted under 35 U.S.C. 154(b) by 695 days.

(21) Appl. No.: 10/625,893

(22) Filed: Jul. 24, 2003

(65) Prior Publication Data

US 2005/0007992 A1 Jan. 13, 2005

Related U.S. Application Data

(60) Provisional application No. 60/472,734, filed on May 23, 2003.

(51) Int. Cl.
*H04B 7/00* (2006.01)
*H04W 4/00* (2009.01)
*H04L 12/26* (2006.01)
*H04L 12/56* (2006.01)
*H04M 11/00* (2006.01)

(52) U.S. Cl. ............... 370/349; 370/252; 370/310; 370/328; 370/338; 370/395.2; 455/421; 455/466; 455/560

(58) Field of Classification Search ... 455/456.1–456.6, 455/433–434, 436–451, 452.1, 452.2, 453, 455/466, 403, 458, 550.1, 560–561, 422.1, 455/432.1, 432.2, 432.3, 67.11, 412.2, 418–421, 455/423–425, 435.1, 513, 517, 556.2; 370/395.52–395.53, 370/395.5, 386, 389, 360, 363, 349, 463, 370/352–353, 337–339, 331–333, 328–329, 370/311–313, 249, 252, 310, 338, 395.2, 370/395.4, 456, 459, 913; 709/206, 218, 709/226, 228–229

See application file for complete search history.

(56) References Cited

U.S. PATENT DOCUMENTS 5,889,770 A * 3/1999 Jokiaho et al. .............. 370/337

(Continued)

FOREIGN PATENT DOCUMENTS

EP 1 079 655 A1 2/2001

(Continued)

OTHER PUBLICATIONS

$3^{rd}$ Generation Partnership Project 2 "3GPP2" "IP Network Architecture Model for cdma2000 Spread Spectrum Systems"; XP-002289701; S.R0037-0; May 14, 2002; Version 2.0; pp. 1-46.

*Primary Examiner*—Meless N Zewdu
(74) *Attorney, Agent, or Firm*—Squire, Sanders & Dempsey L.L.P.

(57) ABSTRACT

The present invention relates to a packet data communication system and a method for use in a packet data communication system. The system includes at least one access network configured to provide a wireless interface between a mobile device and the access network for communication of packet data and a core network including at least one core network node for supporting the communication of packet data on the wireless interface. A controller is provided in association with the access network and configured to monitor at least one condition associated with the wireless interface. If the monitoring indicates that the at least one condition is met, the controller sends messages to the core network node in response to messages from the core network node.

40 Claims, 5 Drawing Sheets

U.S. PATENT DOCUMENTS

| | | | |
|---|---|---|---|
| 6,041,235 A * | 3/2000 | Aalto | 455/437 |
| 6,161,061 A * | 12/2000 | Bessacini et al. | 701/1 |
| 6,285,667 B1 * | 9/2001 | Willars et al. | 370/329 |
| 6,580,699 B1 * | 6/2003 | Manning et al. | 370/331 |
| 6,584,314 B1 * | 6/2003 | Haumont et al. | 455/435.1 |
| 6,792,278 B1 * | 9/2004 | Ahmavaara et al. | 455/461 |
| 7,003,294 B2 * | 2/2006 | Singhai et al. | 455/435.1 |
| 7,089,023 B2 * | 8/2006 | Vialen et al. | 455/458 |
| 7,151,941 B2 * | 12/2006 | Vanttinen et al. | 455/456.2 |
| 7,154,903 B2 * | 12/2006 | Sivalingham | 370/429 |
| 2002/0029261 A1 * | 3/2002 | Shibata | 709/219 |
| 2002/0057658 A1 * | 5/2002 | Lim | 370/331 |
| 2003/0137848 A1 * | 7/2003 | Chang et al. | 362/418 |
| 2004/0127238 A1 * | 7/2004 | Bianconi et al. | 455/466 |
| 2005/0239476 A1 * | 10/2005 | Betrabet et al. | 455/456.1 |

FOREIGN PATENT DOCUMENTS

| | | |
|---|---|---|
| WO | WO 00/72572 A1 | 11/2000 |
| WO | WO 02/47404 A2 | 6/2002 |
| WO | WO 02/056564 A1 | 7/2002 |
| WO | WO 02/082824 A2 * | 10/2002 |

* cited by examiner

WIRELESS DATA COMMUNICATIONS

CROSS REFERENCE TO RELATED APPLICATIONS

This application claims priority of U.S. Provisional Patent Application Ser. No. 60/472,734, entitled "Wireless Data Communications," filed on May 23, 2003, the contents of which are hereby incorporated by reference in their entirety.

BACKGROUND OF THE INVENTION

1. Field of the Invention

The present specification relates generally to communication of data. This specification also relates generally to communication of packet data on a wireless interface between a mobile device and an access network in a communication system.

2. Description of the Related Art

A communication system is typically a facility that enables communication between two or more entities such as, but not limited to, user equipment and/or networks entities and/or other nodes associated with the communication system. The communication may include, for example, communication of various kinds of data such as voice data, electronic mail (email), text messages, content data, multimedia and so on. The communication system may be used for provisioning the users thereof with various types of services.

A communication system typically operates in accordance with a given standard or specification which commonly sets out what the various elements of the system are permitted to do and how that should be achieved. For example, the standard or specification may define if the user, or more precisely, user equipment is provided with a circuit switched service or a packet switched service or both. Communication protocols and/or parameters which may be used for the connection are also typically defined. For example, the manner of how communication may be implemented between the user equipment and the elements of the communication network is typically based on a predefined communication protocol. In other words, a specific set of "rules" on which the communication may be based on is preferably defined to enable the user equipment to communicate via the communication system.

The communication may be provided, for example, via fixed line and/or wireless communication interfaces. A common feature of data communication systems wherein data is transported on wireless interfaces to the user equipment is their ability to provide mobility for the users thereof. Thus these wireless systems may also be referred to as mobile communication systems. Representative, non-limiting examples of communication systems providing wireless communication include the public land mobile network (PLMN), satellite based communication systems and wireless data networks such as the Wireless Local Area Network (WLAN).

The wireless communication systems may be provided based on radio access entities known as cells. Hence such systems are often referred to as cellular communication systems. In a cellular system, a base transceiver station (BTS) of the radio access network (RAN) typically provides a wireless communication facility that serves mobile devices such as, but not limited to, mobile stations (MS) and/or similar mobile user equipment (UE) via an air and/or radio interface within the coverage area of the cell. It shall be appreciated that the name of the station may vary between the different communication systems. For example, names such as base station and Node B may be used for the stations of the communication system. In the context of Wireless Local Area Networks the stations may be called Access Points. The size and shape of the cells may vary from cell to cell. Several cells may also be grouped together to form a larger service area. A base station may provide more than one cell.

Examples of the cellular communications systems include standards such as, but not limited to, the GSM (Global System for Mobile communications) or various GSM based systems such as GPRS (General Packet Radio Service), AMPS (American Mobile Phone System), DAMPS (Digital AMPS), WCDMA (Wideband Code Division Multiple Access), TDMA/CDMA (Time Division Multiple Access/Code Division Multiple Access) in UMTS (Universal Mobile Telecommunications System), CDMA2000, i-Phone and so on.

In representative third generation systems such as the CDMA 2000, the UMTS, etc., the mobile devices may establish a continuous connection through the radio access network (RAN) and the core network (CN) of the cellular system. For example, the continuous connection may be established through an access network controller such as a base station controller (BSC) and/or packet control function (PCF) of the radio access network (RAN) and/or an access gateway of the core network. The access gateway and the access network controller may then maintain context files of the mobile devices and retain these context files for continuous connectivity.

If the mobile device is switched off or is otherwise prevented from communication with the access network, then the connection is typically lost and will generally have to be rebuilt when the mobile device is switched back on or when the reason blocking the communication is removed. Once the access gateway and access network controller determine that the mobile device has been switched off, or is otherwise out of reach, the context files for the mobile device are usually torn down.

It may happen that a mobile device is not deliberately deactivated but rather falls out of a coverage area, or enters within a blind spot in the coverage area. This may result, for example, when the user moves behind a tall building, into a tunnel, out of a cell and so on. Should this happen, then the mobile device may be temporarily unable to respond to requests or other messages from an access gateway or an access network controller. Once the mobile device comes back into the radio coverage, it then preferably rebuilds the context file with the access network controller and the access gateway. This may, in many cases, cause additional and unwanted signaling over the radio link. In addition to causing load on the radio link, this additional signaling may also reduce battery life of the mobile device.

For example, it has been proposed that in the CDMA2000 the support for always-on mobile devices must be a mandatory feature of the access gateway. The access gateway may be provided by means of a packet data support node (PDSN). In the proposal, the 'Always On' service typically maintains the subscriber's packet data session in the local network. In brief, in the Always On service the access gateway is generally arranged such that it does not initiate release of a packet data session unless it is certain that the mobile device is no longer reachable.

Two types of services are often currently proposed, the Mobile IP service and Simple IP service. One of the major differences between the Mobile IP service and Simple IP services has to do with the way that the mobility detection management is handled. With the Simple IP service, the packet data service is typically disrupted when the mobile device moves to another access gateway or point of attachment. The Mobile IP service generally aims to try to avoid any disruptions in the service is such occasions.

Proposal No. TR45.6/2002.08.05.10r1, dated August 2002, prepared for TIA (Telecommunications Industry Association) Subcommittee Adjunct Wireless Packet Data Standards and titled Proposed Resolution to Battery Life and Reachability issues in PN-3-4732-RV2-A (Research In Motion Ballot comment #1), by Dan Willey and Willy Verbestel, relates to these issues. The proposal describes how a packet data support node (PDSN) or access gateway may perform an operation known as the layer 2 Point-to-Point Protocol (PPP) link (LCP) Link Layer Protocol Echo-Request message. Those interested can find a more detailed description of the Echo-Request message from the Internet Engineering Task Force (IETF) document RFC 1661.

In a communication system operated in accordance with the protocol, a mobile device typically responds to a LCP Echo-Request message with a LCP Echo-Reply message within a specified time. The PDSN may maintain a configurable Echo-Reply-Timeout timer and an Echo-Request-Retries counter. Upon entering the Internet Protocol Control Protocol (IPCP) Opened state on a Point-to-Point Protocol (PPP) session configured for the Always On Service, the PDSN may also start a PPP inactivity timer for the PPP session in question. Upon expiration of the PPP inactivity timer, the PDSN commonly sends an LCP Echo-Request message over the main service instance, and generally starts the Echo-Reply-Timeout timer for the PPP session in question. The PDSN may also initialize the Echo-Request-Retries counter to a configurable integer value. The arrangement is often such that if the Echo-Request-Retries counter value is greater than zero upon expiration of the Echo-Reply-Timeout timer, the PDSN sends an LCP Echo-Request message, decrements the Echo-Request-Retries counter by one, and/or starts the Echo-Reply-Time out timer. For the Simple IP service, the proposal is typically that the mobile station is preferably to be informed of the value of the PPP inactivity timer.

Upon receipt of an LCP Echo-Reply message for the PPP session in question, the PDSN generally stops the Echo-Reply-Timeout timer, normally resets the Echo-Request-Retries counter, and typically restarts the PPP inactivity timer. Upon expiration of the Echo-Reply-Timeout timer when the Echo-Request-Retries counter value is equal to zero, the PDSN usually releases the PPP session. In most cases, the PDSN can only tear down the PPP after the expiration of the PPP inactivity timer. However, if the mobile device is out of the radio coverage long enough, then the network may release the packet data session. Thus, the mobile device may still need to restart the packet data session.

Furthermore, in order to preserve battery life for the always-on mobile device and to avoid wasting air interface capacity, the proposal suggests that a two hour PPP inactivity timer value be used for the always-on mobile device.

The above described operation may result in a substantive amount of signaling and waste of resources. Further, the current CDMA2000 Wireless IP network and radio access network still do not generally satisfactorily support the 'Always On' service when the mobile station is temporarily out of coverage. The proposal typically offers only limited relief for the Simple IP services.

The requirement of never tearing down the PPP may also violate the approved CDMA2000 specifications. The PDSN generally must comply with any requests by the RAN to clear the resource via Clear Procedures. Furthermore, the current design commonly has the Echo-Request-Retries as a configurable value. This value may be set fairly high to ensure the session is preserved. A drawback of this is that the RAN and PDSN resources are often unnecessarily allocated. Furthermore, the proposal typically necessitates implementation of trigger and timer logics in the mobile station.

SUMMARY OF THE INVENTION

According to one embodiment of the present invention, there is provided a data communication system, including at least one access network configured to provide a wireless interface between a mobile device and the access network for communication of packet data. A core network is provided that includes at least one core network node for supporting communication of packet data on the wireless interface. A controller is provided in association with the access network, configured to monitor at least one condition associated with the wireless interface. If the monitoring indicates that the at least one condition is met, the controller sends messages to the core network node in response to messages from the core network node.

According to another embodiment of the present invention, there is provided a method in a data communication system. The method includes establishing a data communication link via an access network of the data communication system to a mobile device on a wireless interface between the access network and the mobile device. The method also includes sending a message from a core network of the data communication system to the mobile device via the access network. The method further includes detecting at a controller provided in association with the access network that at least one trigger condition associated with the wireless interface is met. In addition, subsequent to such detection, the method includes sending a further message from the controller to the core network.

According to yet another embodiment of the present invention, there is provided another method in a data communication system. The method includes establishing a data communication link via an access network of the data communication system to a mobile device on a wireless interface between the access network and the mobile device. The method also includes detecting, at a controller provided in association with the access network, that the mobile device is out of reach. The method further includes notifying the core network that the mobile device is out of reach. In addition, in response to receiving the notification, the method includes pausing from sending further data packets from the core network to the mobile device and processing the data packets in accordance with a predefined policy.

The embodiments of the invention may provide various advantages. The embodiments may enable correct preservation of an ongoing packet data session between a core network entity and a mobile device in circumstances wherein the wireless connection is temporarily lost. The amount of signalling may also be reduced. For example, in at least some of the detailed embodiments described below, the amount of signaling and use of radio resources between a packet data support node of the core network and a mobile station, a base station controller or a packet control function and a mobile station, a base station controller or a packet control function and a mobile switching center (MSC) may be reduced significantly or eliminated entirely. The power consumption of the mobile device may be reduced, thus reducing the battery usage and increasing the battery life. In certain embodiments and/or applications, accurate accounting data may be achieved because the core network node typically does not need to count packets forwarded to the radio access network.

Some of the embodiments may result in reduced service disruption in packet data service applications.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Figure 1:
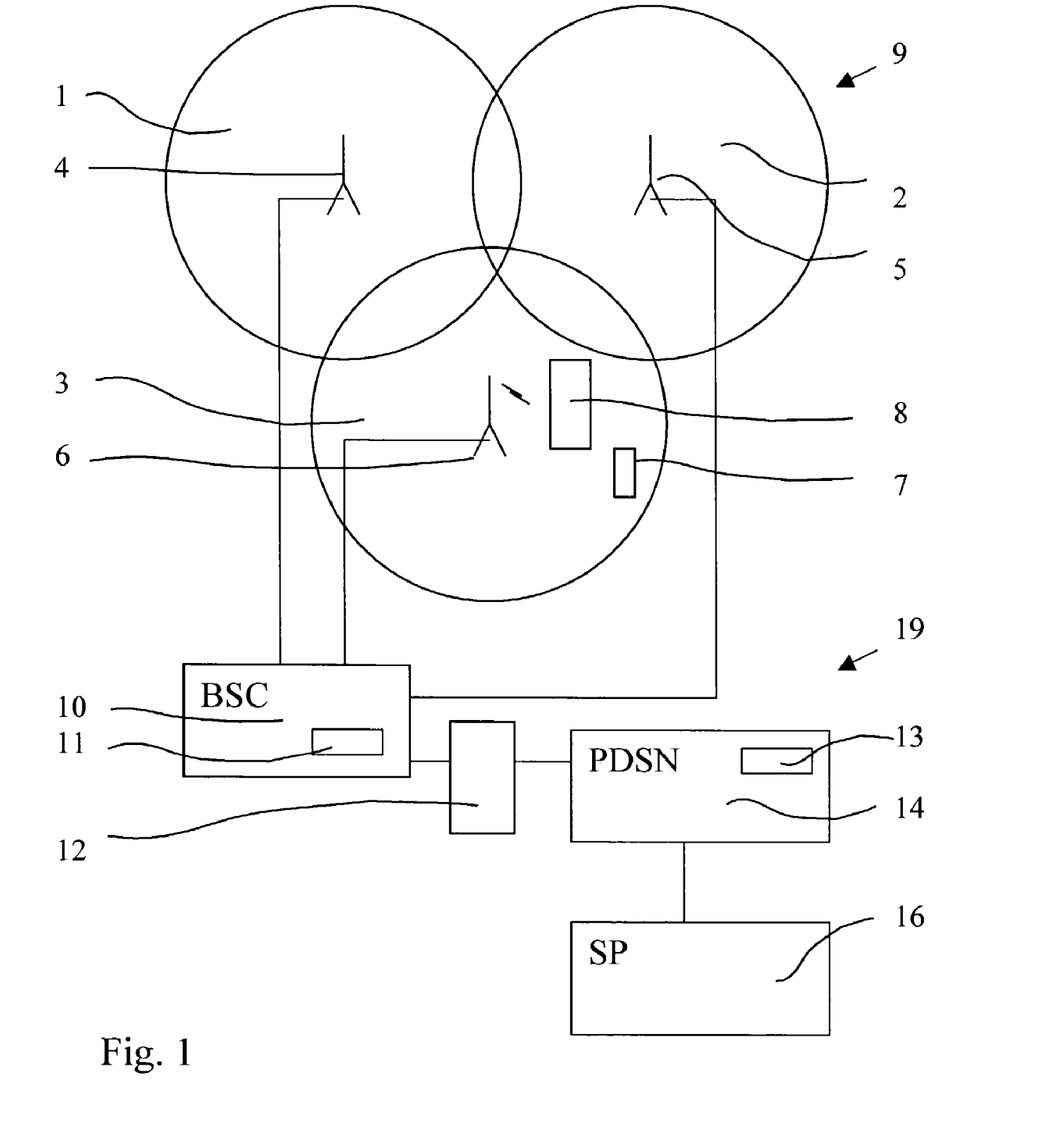
FIG. 1 shows a communications system embodying certain embodiments of the present invention.

Before explaining the preferred embodiments of the invention in more detail, a reference is made to FIG. 1, which is a simplified presentation of a part of a representative cellular system. More particularly, FIG. 1 shows some of the elements of a common radio access network (RAN) 9 and a representative core network (CN) 19 of a cellular system.

In the shown arrangement three base stations 4, 5 and 6 provide three access entities or cells 1 to 3 of a cellular telecommunications network. The cells are typically controlled by a controller entity 10. This entity will be referenced below as the base station controller. These entities generally belong to the radio access network 9.

Figure 2:
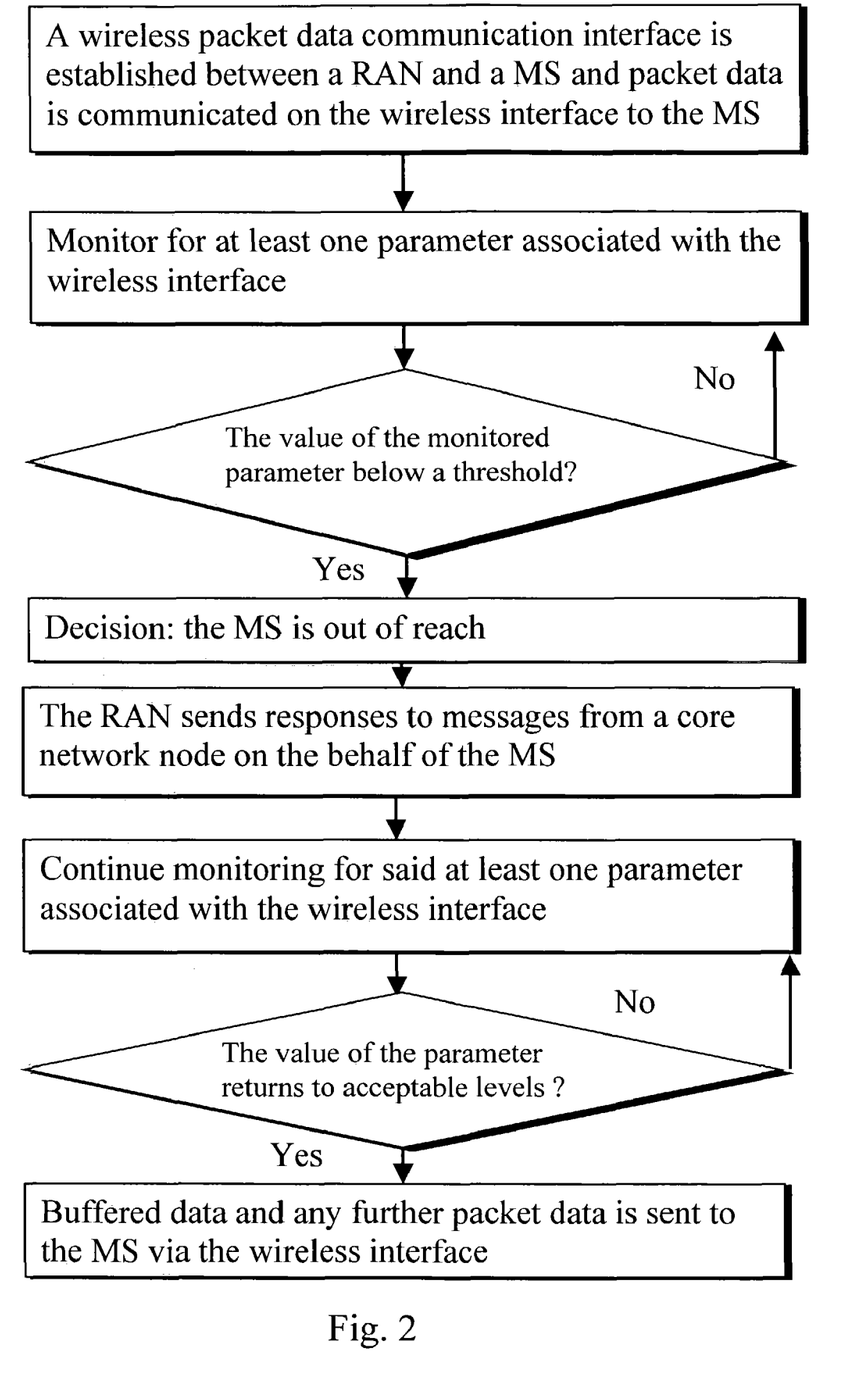
FIG. 2 is a flowchart illustrating an embodiment of the present invention.

It shall be appreciated that the FIG. 2 presentation is highly schematic and that in practical implementations the number of base stations may be substantially higher. One cell may include more than one base station site. A base station apparatus or site may also provide more than one cell. The radio access network may also comprise only one cell. These features depend on the implementation and circumstances.

Each base station 4 to 6 is generally arranged to transmit signals to (downlink) and receive signals from (uplink) a mobile device 7 of a mobile user via a wireless interface. The mobile user may use any appropriate mobile device adapted for Internet Protocol (IP) or other packet data communication via the network. For example, the mobile user may access the cellular network by means of a Personal computer (PC), Personal Data Assistant (PDA), mobile station (MS) and so on. The following examples are described in the context of mobile stations.

The skilled person is familiar with the features and operation of a typical mobile station. Hence, it is sufficient to note that the user may use the mobile station 7 for tasks such as, but not limited to, for making and receiving phone calls, for receiving and sending data from and to the network and for experiencing, for example, multimedia content. The mobile station may include an antenna element (not shown for the sake of clarity) for wirelessly receiving and transmitting signals from and to base stations of the mobile communication network. The mobile station 7 may also be provided with a display for displaying images and other graphical information for the user of the mobile user equipment. Speaker means are also typically provided. The operation of the mobile user equipment may be controlled by means of an appropriate user interface such as control buttons, voice commands and so on.

Furthermore, a mobile user equipment is typically provided with a processor entity and a memory means.

The mobile station 7 is generally able to transmit signals on the uplink to and receive signals on the downlink from the base stations via the wireless interface. It may be appreciated that although only one mobile station 7 is shown in FIG. 1 for clarity, a number of mobile stations may be in simultaneous communication with each base station.

The radio access network 11 is normally controlled by an appropriate controller 10. The controller 10 may be provided by any appropriate controller. A controller may be provided for each base station or a controller may control a plurality of base stations. Solutions wherein controllers are provided both in individual base stations and in the radio access network level for controlling a plurality of base stations are also known within the scope of certain embodiments of the present invention. It shall thus be appreciated that the name, location and number of the radio access network controllers typically depends on the system. For example, a UMTS terrestrial radio access network (UTRAN) may employ a controller node that is referred to as a radio network controller (RNC). In the GSM and CDMA2000, a radio network controller entity may be provided by a base station controller (BSC). In FIG. 1 the possible radio network controllers are denoted by the controller entity 10.

The core network (CN) entities typically comprise various switching elements and gateways for enabling the communication via a number of radio access networks and also for interfacing the one cellular system with other communication system such as, but not limited to, with other cellular systems and/or fixed line communication systems. The controller entity 10 associated with the radio access network may be connected to any appropriate core network element via a suitable interface and/or gateway arrangement.

In FIG. 1 element 12 may include a packet control function (PCF) that is generally provided between the radio access network 9 and an access gateway 14 of the core network 19. In the FIG. 1 the access gateway is often provided by means of a packet data support node (PDSN) 14.

FIG. 1 also shows a service provider entity 16. The entity 16 commonly forms a possible source of packet data to be sent to the mobile station 7 via the core network 19 and radio access network 9 of the communication system. The service provider entity 16 shall be understood as being any appropriate entity that may provide any content data or other data to the mobile station. The service provider entity 16 may include a server and/or any other data processing means. The service provider entity 16 may also be just a node in an Internet Protocol (IP) network. The service provider entity may be run and managed by an external service provider and/or by the operator of the communication network. It shall be appreciated that the service provider entity does not necessarily form an essential element of the present invention.

The mobile telecommunications networks typically provide mobility for the users thereof. In other words, a mobile device such as, but not limited to, the mobile station 7 is generally able to move from one cell coverage area to another cell coverage area. The location of the mobile station 7 may thus vary in time as the mobile station is usually free to move from one location (base station coverage area or cell) to another location (to another cell) and also within one cell.

Thus the mobile station 7 may temporarily move into a location where the wireless interface is blocked or where the mobile station and the respective base station cannot otherwise communicate with each other on the wireless interface. In the following, such a mobile station is referred to as being out of coverage. In FIG. 1, such a temporary out of coverage situation generally occurs when the mobile station 7 moves into position where the signals from the base station 6 are blocked by a building 8.

In the first embodiment, a monitoring mechanism may be implemented in a controller associated with the radio access network for monitoring requests or other messages from the gateway node. The other messages may be any messages requiring a response by the mobile station 7 in order to maintain the packet data connection. In FIG. 1 the controller providing the monitoring mechanism 11 is typically implemented at the controller entity 10.

The monitoring mechanism 11 may also be used for monitoring at least one parameter that associates with the wireless interface between the radio access network and the mobile station 7. Upon the parameter meeting a predefined condition, the monitoring mechanism may then send a message to the core network. The message may be sent as a response to a message from the core network, or the message may be a notification regarding the status of the wireless interface between the mobile station 7 and the access network 9.

The operation in accordance with a representative embodiment will now be described with reference to the flowchart of FIG. 2. In some preferred embodiments, the monitoring mechanism monitors for the strength of the signals transmitted in the uplink from the mobile station to the base station in association with an established packet data communication interface. According to some preferred embodiments, the signal strength of link layer frames continuously transmitted by the mobile station 7 may be measured and monitored by the monitoring function 11 of the radio access network (RAN) 9.

A certain threshold value may be assigned for the signal strength. If the monitoring function detects that the signal strength falls below the threshold, the monitoring function 11 may determine if the mobile station 7 has fallen out of the coverage area and thus no longer has a proper communication interface with the base station 6. The monitoring function 11 may then respond to requests from the core network on the behalf of the mobile station 7 in order to prevent the core network from tearing down the packet data connection.

The monitoring function 11 may continue the monitoring until it is decided that the connection may be torn down anyway. This may be based on a local policy. For example, the rules regarding this may be set on the access network level or to concern a group of access networks covering a certain area. The decision of whether to tear the connection down may be based on any appropriate criteria. For example, the decision may be based on a timer or information regarding the subscriber profile, the service type, the quality of service and so on.

Should the monitoring reveal that the mobile station is again reachable, in other words, returns within the radio coverage of the base station, any unsent data may be sent to the mobile station via the radio access network. The unsent data from the service provider may have been buffered at the packed data support node 14, for example, in the buffer 13 thereof. The packet data communication may then continue as before. The decision whether to buffer or drop packets may also be based on a local policy.

Figure 3:
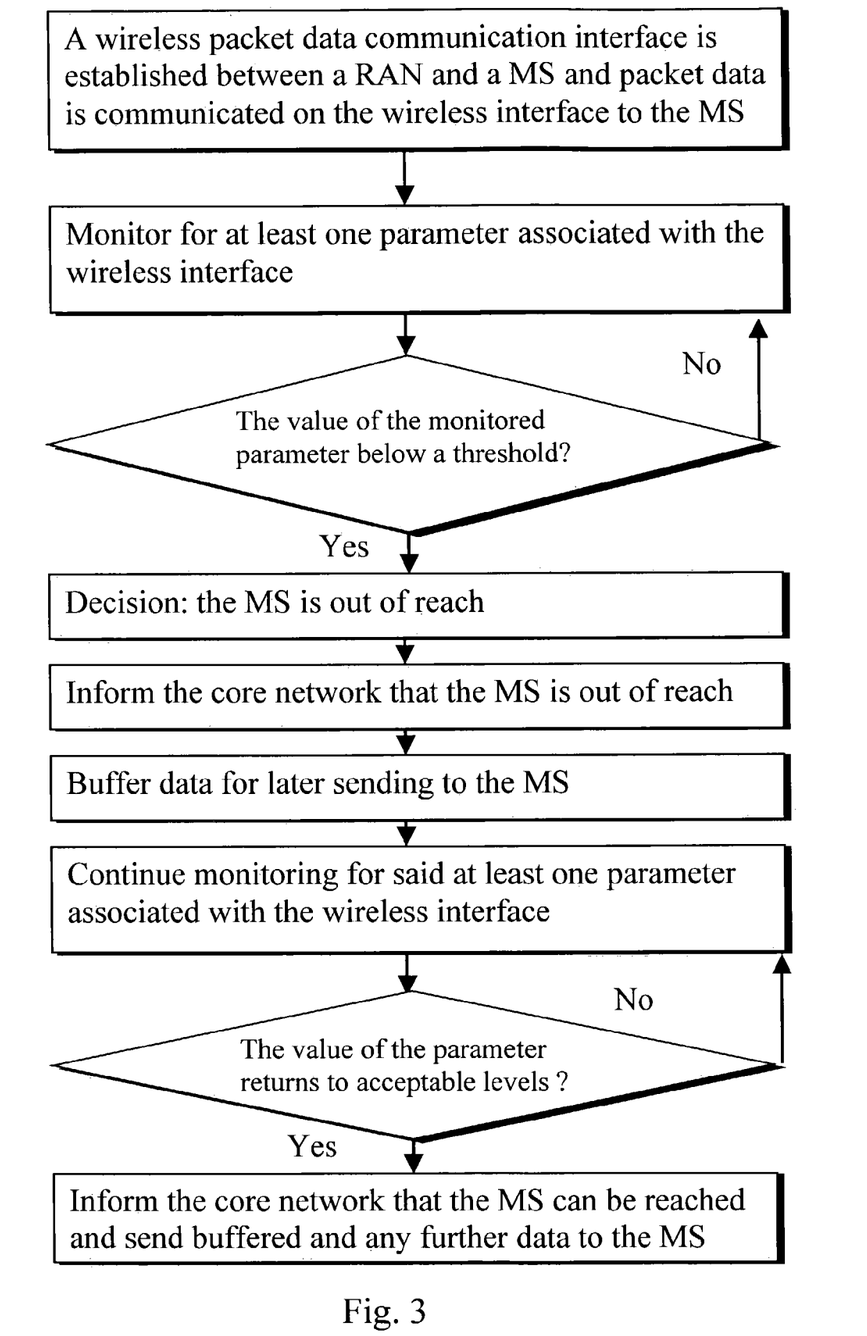
FIG. 3 is a flowchart illustrating another embodiment of the present invention.

As shown in FIG. 3, the monitoring function 11 may send a notification to a node in the core network 19 that the mobile station 7 is not available. The notification may be sent as an alternative to sending responses on behalf of the mobile station. The notifications may also be sent in addition to sending responses to messages from the core network.

In FIG. 1, the monitoring mechanism 11 is typically provided at the base station controller 10. The monitoring mechanism may also be provided in any other node associated with the radio access network. For example, the monitoring function may be provided at the packet control function (PCF) 12.

In the above example, the monitored condition is typically associated with the signal strength. Monitoring of other conditions is also possible. For example, a failed paging of the mobile station may trigger similar actions as above until the mobile station responds to a paging attempt. In another example, the base station may request the mobile station to re-register in defined intervals. If the mobile station does not re-register at the expiration of the interval, it may be concluded that the mobile station cannot be reached. Information from detected pilot signals from the mobile station may also be used in determining the quality of the wireless interface between the mobile station and the base station.

According to certain embodiments, the messages from the core network may be associated with a timer. Typically, if the mobile station does not respond before the expiration of the timer, for example, by indicating deactivation or handover, the access network node may respond on the behalf of the mobile station.

According to certain embodiments, the monitoring mechanism 11 monitors for a timer at the access network that is activated when a message to the mobile station, for example, a request, arrives from the core network. The timer may be provided to expire a certain period of time before the request from a core network node expires. If the mobile station does not send any signals that could indicate deactivation or handover, the monitoring mechanism may then send a response just before the request expires, thus preventing loss of the established communication interface.

A combination of conditions may also be used. For example, the above described responding mechanism may be triggered if at least one of various possible conditions indicates problems in the quality of the wireless interface. According to certain embodiments, the triggering may occur only if at least two conditions meet the triggering criteria, and so on.

In some communication system, it may not be possible for a controller providing the monitoring mechanism in association with the radio access network to respond to messages from the core network on behalf of the mobile station. This may be so, for example, since the monitoring mechanism may need to have a PPP protocol stack and may need to be aware of the link status message before being able to send such a response. In such instances, the monitoring mechanism may respond to the messages from the core network by sending information that the mobile station cannot be reached. Sending of such notifications is shown in FIG. 3.

The information regarding the status of the mobile station may be, for example, a simple out of coverage indicator or other indicator information to the core network that the mobile station cannot be reached. Such indicators may be chosen to have only two values, such as the binary values zero or one. Some representative examples of the use of such indicators are shown in FIGS. 4 and 5.

Figure 4:
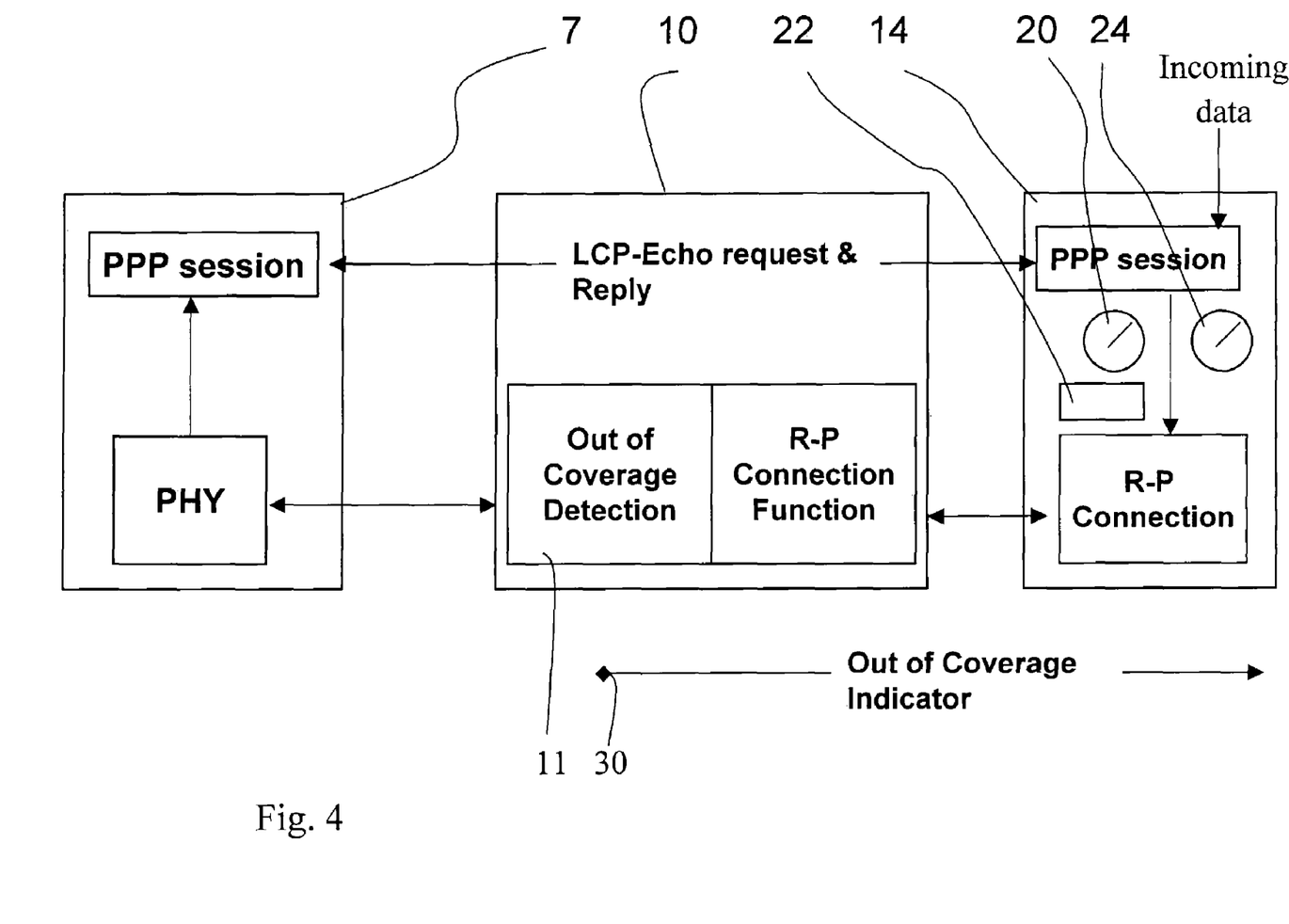
FIG. 4 shows schematically a specific example of an embodiment of the present invention.
Figure 5:
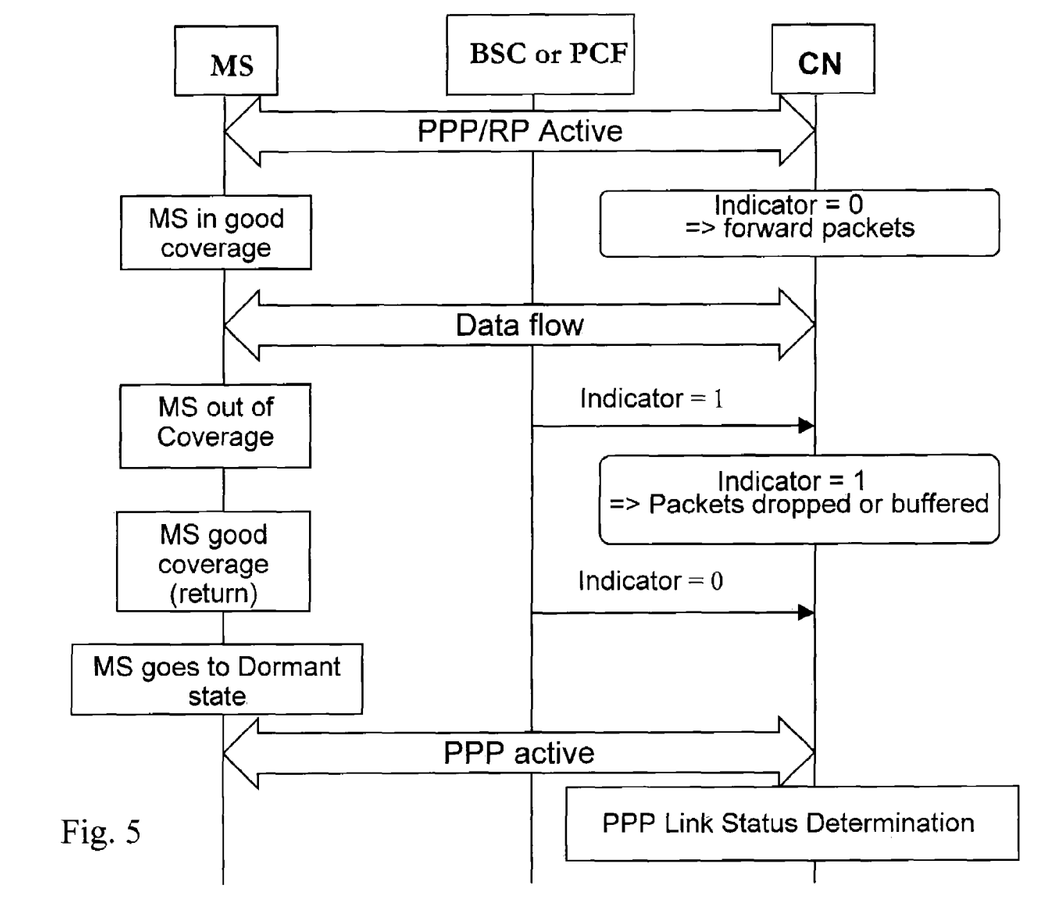
FIG. 5 shows a further embodiment of the present invention.

The following describes an embodiment of the present invention represented generally by FIG. 3 and with reference to FIG. 4. As explained above, it has been proposed that, in order to determine if the mobile station (MS) may be reached, the packet data support node 14 may perform an operation known as the layer 2 PPP link (LCP) Link Layer Protocol Echo-Request message. In accordance with the protocol, upon receiving a LCP Echo-Request message, the mobile station typically responds back with a LCP Echo-Reply.

For implementing the above, the packet data support node 14 may maintain a configurable Echo-Reply-Timeout timer 20 and an Echo-Request-Retries counter 22. Upon entering the Internet Protocol Control Protocol (IPCP) Opened state on a Point-to-Point Protocol (PPP) session configured for the Always On Service, the packet data support node 14 may start an PPP inactivity timer 24 for the PPP session in question. Upon expiration of the PPP inactivity timer, the packet data support node 14 may send an LCP Echo-Request message to the mobile station 7 and/or may start the Echo-Reply-Timeout timer 20 for the PPP session in question. The packet data support node 14 may also initialize the Echo-Request-Retries counter 22 to a configurable integer value.

The arrangement typically is such that upon expiration of the Echo-Reply-Timeout timer 20, when the Echo-Request-Retries counter 22 value is greater than zero, the packet data support node 14 may send an LCP Echo-Request message, decrement the Echo-Request-Retries counter by one, and/or start the Echo-Reply-Timeout timer. Upon receipt of an LCP Echo-Reply message for the PPP session in question, the packet data support node 14 may stop the Echo-Reply-Timeout timer 20, reset the Echo-Request-Retries counter 22, and/or restart the PPP inactivity timer 24. Upon expiration of the Echo-Reply-Timeout timer when the Echo-Request-Retries counter value is equal to zero, the packet data support node 14 is usually allowed to release the PPP session.

According to the embodiment shown in FIG. 4, a node associated with the radio access network may be arranged to respond to the message by sending an out of coverage indicator 30 to the core network, if it is detected by the monitoring function 11 that the mobile station 7 is out of reach. Upon receipt of the indicator, the retries counter 22 may be reset and/or the timer(s) may be restarted. By means of this, it is possible to avoid the connection being dropped.

In accordance with another embodiment shown in FIG. 5, an out of coverage indicator may be sent from the radio access network (RAN) to the PDSN 14 in response to a detection that the mobile station 7 is out of coverage. The indicator may be used by the access gateway, for example, the packet data support node 14 to determine when not to sent messages, for example, the Echo messages, or forward data received from the service provider 16 to the access network (RAN). The RAN may cancel the blocking by sending another indicator to the core network.

The arrangement may be, for example, such that the core network node 14 may send data normally to the radio access network if the value of the indicator is 0. However, if the value of the indicator changes to 1, the core network node may be prevented from sending any data to the radio access network.

In accordance with certain embodiments of the present invention, the monitoring mechanism typically determines the status of the wireless interface between the radio access network and the mobile station upon receiving a data message from the core network. Based on the status, the monitoring mechanism may send in a response to the data message, for example an out of coverage indicator. If the indicator is negative, in other words, if the mobile station is out of reach, the core network may then decide not to send any further data until a positive indicator is received.

It should be appreciated that while certain embodiments of the present invention have been described in relation to mobile stations, many embodiments of the present invention are applicable to any other suitable type of user equipment.

Certain embodiments of the present invention have been described in the context of a CDMA 2000 system. However, other embodiments are also applicable to any other communication standards and access techniques including, but not limited to, wideband code division multiple access, frequency division multiple access, time division multiple access and space division multiple access, as well as any hybrids thereof.

It should also be appreciated that base stations may be referred to with different names in different systems, for example, node B, access point, etc. In addition, the term radio access network is generally intended to also cover a group of cells in instances where more than one cell is controlled by a controller entity. The radio networks controller of the above examples may be replaced by any appropriate access network controller, such as, but not limited to, a WLAN access controller.

It is also noted herein that while the above describes exemplifying embodiments of the invention, there are several variations and modifications which may be made to the disclosed solution without departing from the scope of the present invention as defined in the appended claims.

I claim:

1. A system, comprising:
   at least one access network configured to provide a wireless interface between a mobile device and the at least one access network for communication of packet data;
   a core network comprising at least one core network node configured to support communication of packet data on the wireless interface and configured to release a data communication link associated with the mobile device in the absence of a response to one or more messages directed to the mobile device; and
   a controller provided in association with the at least one access network and configured to monitor at least one condition associated with the wireless interface, and, when the monitoring indicates that the at least one condition is met, to generate and send to the core network node one or more messages in response to one or more of said one or more messages from the core network node.

2. The system of claim 1, wherein the controller is configured to monitor a condition associated with signal strength on the wireless interface.

3. The system of claim 2, wherein the controller is configured to monitor the condition, wherein the condition is associated with the signal strength, and wherein the signal strength comprises the signal strength of uplink link layer frames.

4. The system of claim 1, wherein the controller is configured to monitor a condition that comprises expiration of a timer.

5. The system of claim 4, wherein the controller is configured to monitor the condition that comprises the expiration of the timer and wherein the timer is configured to expire before the expiration of the message.

6. The system of claim 1, wherein the controller is configured to monitor a condition associated with paging of the mobile device.

7. The system of claim 1, wherein the controller is configured to monitor re-registration messages from the mobile device.

8. The system of claim 1, wherein the controller is configured to monitor pilot signals from the mobile device.

9. The system of claim 1, wherein the core network node comprises an access gateway.

10. The system of claim 9, wherein the access gateway comprises a packet data support node.

11. The system of claim 1, wherein the controller is provided in a base station controller.

12. The system of claim 1, wherein the controller is provided in a packet control function associated with the access network.

13. The system of claim 1, wherein the controller is configured to respond to messages that are sent to the mobile device on behalf of the mobile device.

14. The system of claim 1, wherein the controller is configured to send a notification regarding the status of the wireless interface in response to a message from the core network node.

15. A method, comprising:
establishing, by a core network node, a data communication link via an access network of a data communication system to a mobile device on a wireless interface between the access network and the mobile device;
sending one or more messages from the core network node of the data communication system to the mobile device via the access network, wherein the core network is configured to release said data communication link in the absence of a response to said one or more messages;
detecting at a controller provided in association with the access network that at least one trigger condition associated with the wireless interface is met; and
subsequent to said detection, generating at the controller and sending to the core network node one or more messages in response to said one or more messages from the core network node.

16. A method, comprising:
detecting at a controller provided in association with an access network of a data communication system that a mobile device is out of reach, wherein a data communication link is established via the access network to the mobile device on a wireless interface between the access network and the mobile device, wherein a core network node of the data communication system is configured to send one or more messages to the mobile device via the access network, and wherein the core network node is configured to release said data communication link in the absence of a response to said one or more messages; and
notifying, by the controller, said core network node that the mobile device is out of reach, wherein in response to receiving the notification, the core network node is configured to retain said data communication link, to pause from sending further data packets from the core network node to the mobile device, and to process the data packets in accordance with a predefined policy.

17. A system, comprising:
establishing means for establishing a data communication link via an access network of the data communication system to a mobile device on a wireless interface between the access network and the mobile device;
first sending means for sending one or more messages from a core network node of the data communication system to the mobile device via the access network, wherein the core network node is configured to release said data communication link in the absence of a reply to said one or more messages;
detection means for detection at a controller provided in association with the access network that at least one trigger condition associated with the wireless interface is met; and
second sending means for sending a further message from the controller to the core network node subsequent to such detection, wherein the core network node postpones the release of said data communication link in response to said further message.

18. A system, comprising:
an establishing unit configured to establish a data communication link via an access network of the data communication system to a mobile device on a wireless interface between the access network and the mobile device;
a first sending unit configured to send one or messages from a core network node of the data communication system to the mobile device via the access network, wherein the core network node is configured to release said data communication link in the absence of a reply to said one or more messages;
a detector configured to detect at a controller provided in association with the access network that at least one trigger condition associated with the wireless interface is met; and
a second sending unit configured to send a further message from the controller to the core network node subsequent to such detection, wherein the core network node postpones the release of said release link in response to said a further message.

19. An apparatus, comprising:
a processor configured to monitor at least one condition associated with a wireless interface, wherein the apparatus is associated with at least one access network via which a data communication link is established between a mobile device and a core network node configured to release said data communication link in the absence of a response to one or more messages directed to the mobile device; and
a transmitter configured to, in response to an indication that the at least one condition is not met, generate on behalf of the mobile device and transmit to the core network node one or more messages in response to said one or more messages from the core network node, or configured to, in response to an indication that the at least one condition is not met, generate and transmit to the core network node a message, in response to which the core network node postpones the release of said data communication link.

20. The apparatus of claim 19, wherein the processor is configured to monitor a condition associated with signal strength on the wireless interface.

21. The apparatus of claim 20, wherein the signal strength comprises the signal strength of uplink link layer frames.

22. The apparatus of claim 19, wherein the processor is configured to monitor a condition that comprises expiration of a timer.

23. The apparatus of claim 22, wherein the timer is configured to expire before the expiration of the message.

24. The apparatus of claim 19, wherein the processor is configured to monitor a condition associated with paging of the mobile device.

25. The apparatus of claim 19, wherein the processor is configured to monitor re-registration messages from the mobile device.

26. The apparatus of claim 19, wherein the processor is configured to monitor pilot signals from the mobile device.

27. A method, comprising:
monitoring, by a controller, at least one condition associated with a wireless interface constituting part of a data communication link between a mobile device and a core network node configured to release said data communication link in the absence of a response to one or more messages directed to the mobile device; and
in response to an indication that the at least one condition is met, either generating, by the controller, on behalf of the mobile device and sending to the core network node one or more messages in response to said one or more messages from the core network node, or otherwise sending, by the controller, a message to the core network node in response to which the core network node postpones the release of said data communication link.

28. The method of claim 27, comprising monitoring a condition associated with signal strength on the wireless interface.

29. The method of claim 28, wherein the signal strength comprises the signal strength of uplink link layer frames.

30. The method of claim 27, comprising monitoring a condition that comprises expiration of a timer.

31. The method of claim 30, wherein the timer is configured to expire before the expiration of the message.

32. The method of claim 27, comprising monitoring a condition associated with paging of the mobile device.

33. The method of claim 27, comprising monitoring re-registration messages from the mobile device.

34. The method of claim 27, comprising monitoring pilot signals from the mobile device.

35. A base station controller comprising an apparatus according to claim 19.

36. A packet control function associated with the access network comprising an apparatus according to claim 19.

37. A communication system comprising a mobile device, a core network node and an apparatus according to claim 19.

38. A computer program embodied on a computer readable medium, the computer program being configured to control a processor to perform:
   establishing a data communication link via an access network of a data communication system to a mobile device on a wireless interface between the access network and the mobile device;
   sending one or more messages from a core network node of the data communication system to the mobile device via the access network, wherein the core network is configured to release said data communication link in the absence of a response to said one or more messages;
   detecting at a controller provided in association with the access network that at least one trigger condition associated with the wireless interface is met; and
   subsequent to said detecting, generating at the controller and sending to the core network node one or more messages in response to said one or more messages from the core network node.

39. A computer program embodied on a computer readable medium, the computer program being configured to control a processor to perform:
   detecting at a controller provided in association with an access network of a data communication system that a mobile device is out of reach, wherein a data communication link is established via the access network to the mobile device on a wireless interface between the access network and the mobile device, wherein a core network node of the data communication system is configured to send one or more messages to the mobile device via the access network, and wherein the core network node is configured to release said data communication link in the absence of a response to said one or more messages; and
   notifying said core network node that the mobile device is out of reach, wherein in response to receiving the notification, the core network node is configured to retain said data communication link, to pause from sending further data packets from the core network node to the mobile device, and to process the data packets in accordance with a predefined policy.

40. A computer program embodied on a computer readable medium, the computer program being configured to control a processor to perform:
   monitoring at least one condition associated with a wireless interface constituting part of a data communication link between a mobile device and a core network node configured to release said data communication link in the absence of a response to one or more messages directed to the mobile device; and
   in response to an indication that the at least one condition is met, either generating on behalf of the mobile device and sending to the core network node one or more messages in response to said one or more messages from the core network node, or otherwise
   sending a message to the core network node in response to which the core network node postpones the release of said data communication link.

* * * * *